United States Patent
Kato et al.

(10) Patent No.: US 10,370,772 B2
(45) Date of Patent: Aug. 6, 2019

(54) LAYERED COATING FILM, AND COATED ARTICLE

(71) Applicant: MAZDA MOTOR CORPORATION, Hiroshima (JP)

(72) Inventors: Hidekazu Kato, Hiroshima (JP); Kana Haruki, Hiroshima (JP); Naoto Waku, Hiroshima (JP); Kouji Teramoto, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 119 days.

(21) Appl. No.: 15/324,109

(22) PCT Filed: Oct. 29, 2015

(86) PCT No.: PCT/JP2015/005448
§ 371 (c)(1),
(2) Date: Jan. 5, 2017

(87) PCT Pub. No.: WO2016/079933
PCT Pub. Date: May 26, 2016

(65) Prior Publication Data
US 2017/0211201 A1 Jul. 27, 2017

(30) Foreign Application Priority Data
Nov. 21, 2014 (JP) ................. 2014-236687

(51) Int. Cl.
*C25D 15/00* (2006.01)
*C09D 133/12* (2006.01)
(Continued)

(52) U.S. Cl.
CPC ............. *C25D 15/00* (2013.01); *B32B 7/02* (2013.01); *B32B 7/023* (2019.01); *B32B 27/20* (2013.01);
(Continued)

(58) Field of Classification Search
CPC ........ C25D 15/00–15/02; C25D 13/00–13/24; B05D 5/00–5/12; B05D 7/00–7/5885;
(Continued)

(56) References Cited

U.S. PATENT DOCUMENTS 5,243,255 A * 9/1993 Iwasaki ................ C03C 17/22
313/112
6,242,056 B1 * 6/2001 Spencer ................ C09D 7/70
427/512
(Continued)

FOREIGN PATENT DOCUMENTS

JP H11-077874 A 3/1999
JP 2006-007006 A 1/2006
(Continued)

OTHER PUBLICATIONS

Haraguchi et al. "The preparation and characterization of hybrid materials composed of phenolic resin and silica". Journal of Materials Science, 33, (1998); pp. 3337-3344.*
(Continued)

*Primary Examiner* — Prashant J Khatri
(74) *Attorney, Agent, or Firm* — Studebaker & Brackett PC

(57) ABSTRACT

A layered coating film according to the present invention includes a lower coat 30 including a first coloring material and a bright material, and an upper coat 20 superposed on the lower coat and including a second coloring material. The upper coat and the lower coat have similar colors. The refractive index of a film constituent of the lower coat other than the first coloring material is higher than the refractive index of a film constituent of the upper coat other than the second coloring material.

8 Claims, 2 Drawing Sheets

(51) Int. Cl.
*C09D 7/40* (2018.01)
*C09D 5/33* (2006.01)
*B32B 7/023* (2019.01)
*B32B 7/02* (2019.01)
*B32B 27/20* (2006.01)
*C25D 13/04* (2006.01)
*C25D 13/12* (2006.01)

(52) U.S. Cl.
CPC .............. *C09D 5/004* (2013.01); *C09D 7/70* (2018.01); *C09D 133/12* (2013.01); *C25D 13/04* (2013.01); *C25D 13/12* (2013.01); *Y10T 428/24942* (2015.01)

(58) Field of Classification Search
CPC .. B32B 7/00–7/14; B32B 15/00–15/20; B32B 27/20
See application file for complete search history.

(56) References Cited

U.S. PATENT DOCUMENTS

| | | |
|---|---|---|
| 2006/0057398 A1 | 3/2006 | Zimmermann et al. |
| 2010/0003501 A1 | 1/2010 | Liu et al. |
| 2010/0023348 A1 | 1/2010 | Hardee et al. |
| 2010/0189970 A1 | 7/2010 | Pokorny et al. |
| 2014/0255608 A1* | 9/2014 | Eibon ................. C09D 133/00 427/380 |
| 2016/0256893 A1 | 9/2016 | Kato et al. |

FOREIGN PATENT DOCUMENTS

| | | |
|---|---|---|
| JP | 2007-030384 A | 2/2007 |
| JP | 2007-182511 A | 7/2007 |
| JP | 2008-044835 A | 2/2008 |
| JP | 2008-126095 A | 6/2008 |
| JP | 2010-036138 A | 2/2010 |
| JP | 101796146 A | 8/2010 |
| JP | 2010-279899 A | 12/2010 |
| JP | 102119344 A | 7/2011 |
| JP | 2013-230440 A | 11/2013 |
| RU | 2483928 C2 | 6/2013 |
| WO | 2015/064015 A1 | 5/2015 |

OTHER PUBLICATIONS

Monni et al. "Structural and Physical Changes in Phenol-Formaldehyde Resol Resin as a Function of the Degree of Condensation of the Resol Solution". Industrial & Engineering Chemistry Research, 46, (2007); pp. 6916-6924.*

International Search Report issued in PCT/JP2015/005448; dated Jan. 26, 2016.

* cited by examiner

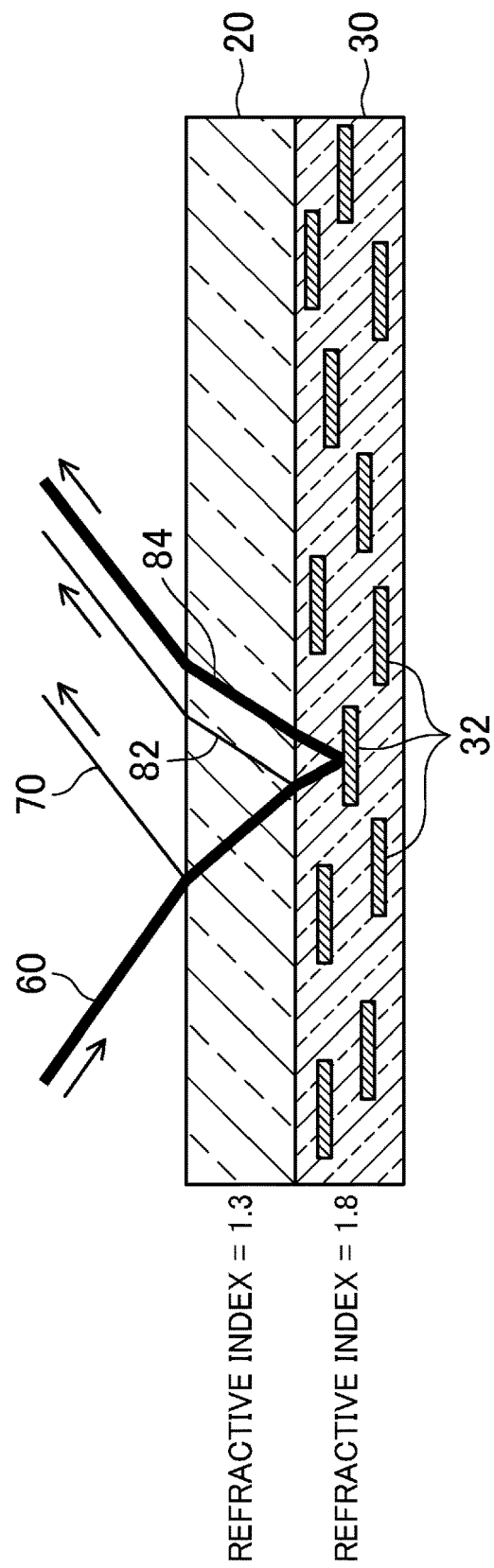

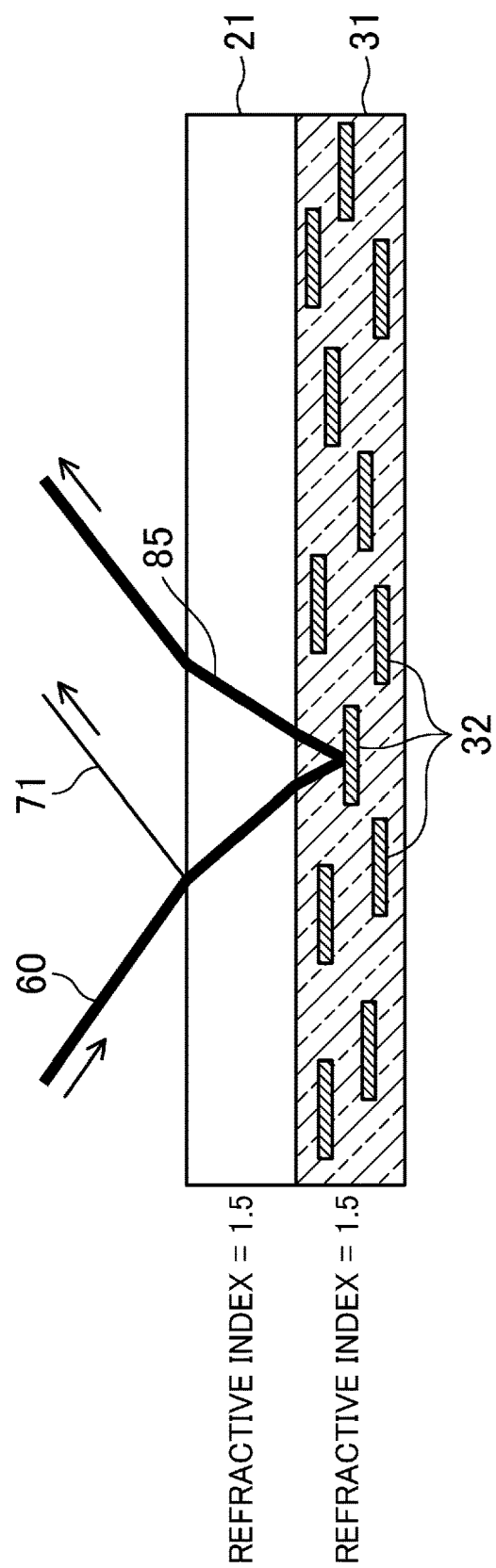

LAYERED COATING FILM, AND COATED ARTICLE

TECHNICAL FIELD

The present invention relates to a layered coating film and a coated article.

BACKGROUND ART

In coating automobile bodies and other products, a coating structure has been widely adopted where an undercoat made of a rust-preventing electrodeposition paint, an intermediate coat having the ability to conceal the undercoat, and a topcoat (a base coat and a clear coat) are superposed one upon the other in this order. In order to, e.g., save resources, an attempt has also been made to apply a topcoat directly over an undercoat without an intermediate coat. For example, a base coat having the ability to conceal an undercoat is formed on a cationic electrodeposition coat, and a clear coat is formed on this base coat.

Attempts to allow automobile coatings to have an unprecedented impressive appearance by adjusting the refractive indices of base coats and clear coats are known in the art. For example, Patent Document 1 discloses a technique for allowing the brightness of a coating to change depending on the viewing angle by setting the refractive index of the clear coat to 1.522, while setting a difference between the refractive indices of the base coat and the clear coat to 0.015 or more. Moreover, Patent Document 1 also teaches that an acrylic resin including 50 mass % or more of t-butyl methacrylate exhibits a low refractive index, and that an acrylic resin including 40 mass % or more of styrene exhibits a high refractive index.

Patent Document 2 recites that if $ZnO_2$ nanoparticles are dispersed in a resin, the resin may have an increased refractive index, and also teaches using such a resin as a coating composition.

CITATION LIST

Patent Documents

PATENT DOCUMENT 1: Japanese Unexamined Patent Publication No. 2006-007006
PATENT DOCUMENT 2: Japanese Unexamined Patent Publication No. 2008-044835

SUMMARY OF THE INVENTION

Technical Problem

Coatings are applied primarily for the purpose of imparting an unprecedented impressive design to the article to be coated. In recent years, individual likings have become diversified. Yet when it comes to color preferences, relatively many people prefer brilliant colors. However, a technique to control the development of such a brilliant color properly cannot be derived from any of the patent documents cited above.

In view of the foregoing background, it is therefore an object of the present invention to provide a layered coating film and coated article exhibiting a brilliant color.

Solution to the Problem

A layered coating film according to the present invention includes: a lower coat including a first coloring material and a bright material; and an upper coat superposed on the lower coat and including a second coloring material. The upper coat and the lower coat have similar colors. The layered coating film is configured such that the refractive index of a film constituent of the lower coat other than the first coloring material is higher than the refractive index of a film constituent of the upper coat other than the second coloring material. As used herein, the term "coloring material" refers to a component such as a pigment or a dye providing a color to a coating.

According to this configuration, the layered coating film exhibits a brilliant color due to a combination of colored light reflected by a bright material in the lower coat to come out of the layered coating film and colored light reflected from an interface between the upper coat and the lower coat to come out of the layered coating film.

In an exemplary embodiment of the present invention, a film constituent of the upper coat other than the second coloring material includes a resin, and nanoparticles having a lower refractive index than the resin. Thus, the refractive index of the upper coat may be easily adjusted to a lower level.

In another exemplary embodiment of the present invention, a film constituent of the lower coat other than the first coloring material includes a resin, and nanoparticles having a higher refractive index than the resin. Thus, the refractive index of the lower coat may be easily adjusted to a higher level.

In still another exemplary embodiment of the present invention, a protective coat is provided on the upper coat. Thus, the upper coat may be protected reliably.

In yet another exemplary embodiment of the present invention, the second coloring material includes the same coloring material as the first coloring material. Thus, a colored light beam coming out of the upper coat has the same color as a colored light beam coming out of the lower coat, so that the layered coating film exhibits an even more brilliant color.

A coated article according to the present invention comprises a layered coating film according to any of the exemplary embodiments described above.

Advantages of the Invention

A layered coating film according to the present invention allows two colored light beams in similar colors to come out of itself via two different optical paths, thus exhibiting a brilliant color.

BRIEF DESCRIPTION OF THE DRAWINGS

FIG. 1 is a schematic cross-sectional view of a layered coating film according to an embodiment.
FIG. 2 is a schematic cross-sectional view of a layered coating film according to a comparative example.

DESCRIPTION OF EMBODIMENTS

Embodiments of the present invention will now be described in detail with reference to the accompanying drawings. Note that in the following drawings, components having substantially the same functions are denoted by the same reference characters for the sake of simplicity.

First Embodiment

As shown in FIG. 1, a layered coating film according to a first embodiment has a two-layer structure comprised of, from top to bottom, an upper coat 20 and a lower coat 30. The upper coat 20 is colored and transparent, and may be made of, e.g., a synthetic resin containing a second coloring material. The lower coat 30 is colored and transparent, contains a bright material 32 reflecting light, and may be made of a synthetic resin containing, e.g., a first coloring material and the bright material 32.

The second coloring material included in the upper coat 20 contains a pigment. The first coloring material included in the lower coat 30 also contains a pigment. Further, the upper coat 20 and the lower coat 30 have similar colors. To allow these coats to have similar colors, the upper coat 20 and the lower coat 30 may share at least one pigment of the same type. However, these coats may also have similar colors even if they contain different pigments.

The upper coat 20 and the lower coat 30 suitably have almost the same, similar colors to allow the layered coating film to exhibit a brilliant color overall. As used herein, the "similar colors" may be defined as colors of the same hue according to the Practical Color Coordinate System (PCCS) of the Japan Color Research Institute, for example.

The refractive index of an acrylic resin commonly used for coating automobile bodies is 1.5. In the present embodiment, the refractive index of a film constituent of the upper coat 20 is 1.3, as shown in FIG. 1, which is lower than that of the acrylic resin.

Beneficially, the refractive index of a film constituent of the lower coat 30 other than the first coloring material and the bright material 32 is higher than that of the film constituent of the upper coat 20, and may be 1.8 in this embodiment.

The refractive index of a film constituent of the upper coat 20 is beneficially higher than or equal to 1.2 and less than 1.5, and more beneficially in the range of 1.2 to 1.4. In this way, if the refractive index of the film constituent of the upper coat 20 is lower than that of an ordinary acrylic resin, the surface of the upper coat 20 reflects a smaller amount of light than a coat made of an ordinary acrylic resin. Thus, more light is allowed to enter the layered coating film, and, as a result, more colored light beams may come out of the layered coating film. The refractive index of a film constituent of the lower coat 30 is beneficially higher than 1.5, and more beneficially higher than or equal to 1.6. If there is a significant difference in refractive index between the film constituent of the lower layer 30 and that of the upper layer 20, the reflectance at the interface between these two coats 20, 30 increases.

In order to achieve such refractive indices, in the present embodiment, the film constituent of the lower coat 30 is comprised of a synthetic resin, such as an acrylic resin, a urethane resin, or an epoxy resin, with inorganic nanoparticles added to it to control (increase) the refractive index. The film constituent of the upper coat 20, too, is comprised of a synthetic resin, such as an acrylic resin, a urethane resin, or an epoxy resin, with a different type of inorganic nanoparticles added to it to control (decrease) the refractive index. Examples of inorganic nanoparticles that increase the refractive index include $ZrO_2$, $TiO_2$, and ZnO nanoparticles. Examples of inorganic nanoparticles that decrease the refractive index include $SiO_2$, $CaF_2$, and MgF nanoparticles. The value of the refractive index of a film constituent may be controlled by the type and amount of nanoparticles added.

Although the particle size of the nanoparticles is not particularly limited as long as their size can be regarded as a nanometer scale, those nanoparticles usually have a size of 20 nm or less. If the particle size exceeded 20 nm, the transparency could diminish, e.g., when the nanoparticles are dispersed in a resin. The nanoparticles suitably have a particle size of 1 nm to 19 nm, and more suitably have a particle size of 2 nm to 18 nm.

To measure the particle size of the nanoparticles, a common measurement technique may be employed. The nanoparticles may be observed with magnification through, e.g., a transmission electron microscope (TEM), a field emission transmission electron microscope (FE-TEM), or a field emission scanning electron microscope (FE-SEM) and the lengths of 100 randomly selected particles may be measured in the major axis direction thereof. The mean value of the lengths thus measured may be defined as their particle size. The particles may come in various different shapes, such as spheres, ellipsoids, cubes, cuboids, pyramids, needle-like shapes, column-like shapes, rods, cylinders, scales, plates or flakes. Yet, when the particle size of the particles is measured, their length is supposed to be measured in the major axis direction thereof.

Beneficially, the lower coat 30 has a higher coloring material content ratio with respect to the synthetic resin than the upper coat 20. If the upper coat 20 has a content ratio higher than or equal to that of the lower coat 30, the light absorptance at the upper coat 20 increases. Consequently, the color of the layered coating film itself may become darker and loose its brightness. If, in an attempt to avoid this outcome, the coloring material of the entire layered coating film is decreased in amount, a color of a desired depth could not be obtained.

Optionally, a base layer may be provided between an article to be coated and the lower coat 30. The base layer may be a two-layered coat including an undercoat and an intermediate coat superposed on the undercoat. The undercoat may be an epoxy-based cationic electrodeposition paint formed on, for example, a surface of a coated steel article (e.g., an outer plate of an automobile body). The intermediate coat may have the ability to conceal the undercoat to improve the light-degradation resistance, chipping resistance, and coloring property of the base layer.

In the layered coating film according to the present embodiment, part of incident light 60 is reflected, over a full wavelength range thereof, from the surface of the upper coat 20. Thus, the reflected light beam 70 is a white light beam. The rest of the incident light 60 enters the upper coat 20. Part of the light, having a wavelength falling outside a particular wavelength range, is absorbed into the coloring material, and thus turns into light of a particular color (e.g., a color red). Then, part of the light of the particular color is reflected from the interface between the upper coat 20 and the lower coat 30, and comes out of the layered coating film as a reflected light beam 82. The rest of the light of the particular color enters the lower coat 30, and is reflected by the bright material 32 from the lower coat 30 toward the upper coat 20. Finally, the light of the particular color passes through the upper coat 20, and comes out of the layered coating film as an outgoing light beam 84. Note that the outgoing light beam 84 is light of a deeper color than the reflected light beam 82.

When a person views the layered coating film of the present embodiment from the outside, the person may see two overlapping light beams of a particular color, namely the reflected light beam 82 and the outgoing light beam 84, and thus may find the color of the layered coating film bright. Since the refractive index of the lower coat 30 is higher than that of the upper coat 20, the light reflected from the interface between the upper coat 20 and the lower coat 30 increases in amount. Moreover, since the refractive indices of the coats are controlled by adding inorganic nanoparticles thereto, a desired refractive index may be easily achieved.

Example and Comparative Example

As a layered coating film according to an example, a layered coating film having the structure shown in FIG. 1 and the composition shown in the following Table 1 was formed.

TABLE 1

| Example | | Solid Content by Mass (%) |
|---|---|---|
| Upper Coat | Resin: Acrylic-Based Resin | 52.7 |
| | Coloring Material: Perylene | 1.7 |
| | Coloring Material: Iron Oxide | 5.6 |
| | Nanoparticles: $SiO_2$ | 40 |
| Lower Coat | Resin: Acrylic-Based Resin | 17.6 |
| | Coloring Material: Quinacridone Magenta | 17 |
| | Coloring Material: Perylene | 12 |
| | Coloring Material: Carbon Black | 1.4 |
| | Bright Material: Aluminum Flakes | 12 |
| | Nanoparticles: $ZrO_2$ | 40 |

As the "acrylic-based resin" in Table 1, an acrylic resin (acid value: 20 mg KOH/g; hydroxyl value: 75 mg KOH/g; number average molecular weight: 5000; and solid content: 60% by mass) manufactured by NIPPONPAINT Co., Ltd was used. As the nanoparticles contained in the lower coat 30, a $ZrO_2$ nanoparticle dispersion liquid ($ZrO_2$ solid content: 20% by mass) manufactured by Sumitomo Osaka Cement Co., Ltd. was adopted. As the nanoparticles contained in the upper coat 20, $SiO_2$ nanoparticles (Nano Tek Slurry ($SiO_2$ solid content: 20% by mass) manufactured by C. I. Kasei Co., Ltd.) were used. Further, as a pigment included in the lower coat 30 and in the upper coat 20, quinacridone magenta (Chromofine manufactured by Dainichiseika Color & Chemicals Mfg. Co., Ltd.), perylene (Paliogen Maroon L3920 manufactured by BASF), iron oxide (IPJ-218H manufactured by Toda Kogyo Corp.), and carbon black (Carbon Black #2650 manufactured by Mitsubishi Chemical Corporation) were employed. Aluminum flakes (76 Series manufactured by Toyo Aluminium K.K.) were used as the bright material included in the lower coat 30. The refractive indices of the upper coat 20 and the lower coat 30 were 1.3 and 1.8, respectively.

On the other hand, a layered coating film having the structure shown in FIG. 2 and including coats having the compositions shown in Table 2 was formed as a comparative example. Note that the layered coating film according to the comparative example differs in two respects from the counterpart of the example. Specifically, its upper coat 21 is colorless and transparent, does not include any coloring material, and has a refractive index of 1.5, and its lower coat 31 has a refractive index of 1.5.

TABLE 2

| Comparative Example | | Solid Content by Mass (%) |
|---|---|---|
| Upper Coat | Resin: Acrylic-Based Resin | 100 |
| Lower Coat | Resin: Acrylic-Based Resin | 29.33 |
| | Coloring Material: Quinacridone Magenta | 28.33 |
| | Coloring Material: Perylene | 20 |
| | Coloring Material: Carbon Black | 2.33 |
| | Bright Material: Aluminum Flakes | 20 |

The constituent materials listed in Table 2 are the same as the ones in Table 1.

In the comparative example, the upper coat 21 and the lower coat 31 have the same refractive index, which is why no reflection occurs at the interface between the upper coat 21 and the lower coat 31. Thus, only the outgoing light beam 85 coming out of the lower coat 31 is a red light beam produced by the pigment.

The upper coat 21 according to the comparative example has a refractive index of 1.5, which is why the light is reflected from its surface at a perpendicular reflectance of 4.0% and turns into a reflected light beam 71 accordingly. On the other hand, the upper coat 20 according to the example comprises a film constituent having a refractive index of 1.3, which is why the light is reflected from its surface at a perpendicular reflectance of 1.7%. Thus, the amount of the reflected light beam 70 is approximately 40% of the amount of the reflected light beam 71 of the comparative example. Therefore, according to the example, a larger amount of light enters the layered coating film, and consequently a larger amount of light comes out of the layered coating film.

As can be seen from the foregoing description, compared to the layered coating film according to the comparative example, the layered coating film according to the example appears brighter red.

Other Embodiments

The embodiments described above are mere examples of the claimed invention. However, the present invention is not limited to these examples. Instead, these examples may be combined with well-known, commonly used or publicly known art, or may be partly replaced. Further, modifications that would easily occur to a person skilled in the art are also included in the scope of the invention claimed.

A transparent protective coat may be formed on the upper coat. Beneficially, the protective coat may be made of a resin and may have the same refractive index as the upper coat.

Constituent materials that make the layered coating films according to the embodiments and examples may be replaced with other materials. For example, a resin other than an acrylic-based resin may be used, and a pigment of a different color and type may also be adopted. Further, nanoparticles of a different type may be employed, too. Moreover, the refractive indices of the respective layers are not limited to the above values, either. As a bright material, copper flakes may be used as well.

DESCRIPTION OF REFERENCE CHARACTERS

20 Upper Coat
30 Lower Coat
32 Bright Material

The invention claimed is:
1. A layered coating film comprising:
a lower coat including a first coloring material and aluminum flakes; and
an upper coat superposed on the lower coat and including a second coloring material, wherein:
the upper coat and the lower coat have similar colors,
the refractive index of a film constituent of the lower coat other than the first coloring material is higher than the refractive index of a film constituent of the upper coat other than the second coloring material, the film constituent of the upper coat other than the second coloring material includes an acrylic resin and nanoparticles with a lower refractive index than the acrylic resin, and the film constituent of the lower coat other than the first coloring material and the aluminum flakes includes an acrylic resin.

2. The layered coating film of claim 1, wherein
the film constituent of the lower coat other than the first coloring material further includes a resin and nanoparticles with a higher refractive index than the resin.

3. The layered coating film of claim 1, wherein
a protective coat is provided on the upper coat.

4. The layered coating film of claim 1, wherein
the second coloring material includes the same coloring material as the first coloring material.

5. A coated article comprising:

a layered coating film as a coating of the coated article, the layered coating film including:

a lower coat including a first coloring material and aluminum flakes; and an upper coat superposed on the lower coat and including a second coloring material, wherein:

the upper coat and the lower coat have similar colors, the refractive index of a film constituent of the lower coat other than the first coloring material is higher than the refractive index of a film constituent of the upper coat other than the second coloring material, the film constituent of the upper coat other than the second coloring material includes an acrylic resin and nanoparticles with a lower refractive index than the acrylic resin, and the film constituent of the lower coat other than the first coloring material and the aluminum flakes includes an acrylic resin.

6. The coated article of claim 5, wherein
the film constituent of the lower coat other than the first coloring material further includes a resin and nanoparticles with a higher refractive index than the resin.

7. The coated article of claim 5, wherein
a protective coat is provided on the upper coat.

8. The coated article of claim 5, wherein
the second coloring material includes the same coloring material as the first coloring material.

\* \* \* \* \*